US011722425B2

(12) United States Patent
Fu

(10) Patent No.: US 11,722,425 B2
(45) Date of Patent: Aug. 8, 2023

(54) DATA PACKET DELETING METHOD, DEVICE AND STORAGE MEDIUM

(71) Applicant: GUANGDONG OPPO MOBILE TELECOMMUNICATIONS CORP., LTD., Guangdong (CN)

(72) Inventor: Zhe Fu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/565,203

(22) Filed: Dec. 29, 2021

(65) Prior Publication Data
US 2022/0141146 A1 May 5, 2022

Related U.S. Application Data

(63) Continuation of application No. PCT/CN2019/101193, filed on Aug. 16, 2019.

(51) Int. Cl.
*H04L 47/2483* (2022.01)
*H04L 47/28* (2022.01)
(Continued)

(52) U.S. Cl.
CPC .......... *H04L 47/2483* (2013.01); *H04L 47/28* (2013.01); *H04L 47/32* (2013.01); *H04W 28/0263* (2013.01)

(58) Field of Classification Search
CPC ..... H04L 47/2483; H04L 47/28; H04L 47/32; H04L 67/564; H04L 69/22; H04L 43/0858; H04W 28/0263; H04W 28/10
See application file for complete search history.

(56) References Cited

U.S. PATENT DOCUMENTS

2006/0098574 A1* 5/2006 Yi .......................... H04W 28/06
370/236
2012/0307751 A1* 12/2012 Dinan .................. H04L 5/0042
370/329
(Continued)

FOREIGN PATENT DOCUMENTS

CN         106537857        *  3/2007
CN         106537857 A         3/2017
(Continued)

OTHER PUBLICATIONS

International Search Report (ISR) dated May 19, 2019 for Application No. PCT/CN2019/101193.

Primary Examiner — Mewale A Ambaye
(74) Attorney, Agent, or Firm — Ladas & Parry LLP

(57) ABSTRACT

Embodiments of the present application provide a data packet deleting method, a device and a storage medium, the method includes: when a protocol layer entity of a sender receives an SDU from a higher layer, determining a QoS flow to which the SDU belongs; when the QoS flow to which the SDU belongs is a first QoS flow, the protocol layer entity starts a first discard timer, or the protocol layer entity selects a reference timer from the first discard timer and a second discard timer (a discard timer with DRB granularity), and starts the reference timer; when the first discard timer expires, or, when the reference timer expires, the protocol layer entity deletes the SDU and a PDU corresponding to the SDU.

20 Claims, 9 Drawing Sheets

(51) Int. Cl.
H04L 47/32 (2022.01)
H04W 28/02 (2009.01)

(56) References Cited

U.S. PATENT DOCUMENTS

2015/0223107 A1* 8/2015 Zaus .................. H04L 47/2475
370/230
2019/0053326 A1 2/2019 Lee et al.
2019/0349805 A1* 11/2019 Cheng ............... H04W 28/0263

FOREIGN PATENT DOCUMENTS

| CN | 107787009 A | 3/2018 |
| CN | 108476435 A | 8/2018 |
| CN | 110035095 A | 7/2019 |

* cited by examiner

DATA PACKET DELETING METHOD, DEVICE AND STORAGE MEDIUM

CROSS-REFERENCE TO RELATED APPLICATIONS

This application is a continuation of International Application No. PCT/CN2019/101193, filed on Aug. 16, 2019, the disclosure of which is hereby incorporated by reference in its entity.

TECHNICAL FIELD

Embodiments of the present application relate to the field of communication technologies, and in particular, to a data packet deleting method, a device and a storage medium.

BACKGROUND

With the rapid development of communications technologies, 5 generation mobile communications (5G for short) network is gradually being widely used. A 5G network mainly includes the following types of services: enhanced mobile broadband (eMBB for short), massive machine type communications (mMTC for short), and ultra-reliable and low latency communications (URLLC for short) service.

In the 5G network, when receiving, a service data unit (SDU for short) sent by an upper layer, a protocol layer of a sender may cache the SDU and process the SDU to obtain a protocol data unit (PDU for short) corresponding to the SDU. In order to save a storage space of the sender, it is necessary to delete the SDU and the PDU cached by the protocol layer. In a traditional solution, a discard timer for a data radio bearer (DRB for short) is available, if the network configures a discard timer for a DRB, when receiving an SDU from a higher layer, a packet data convergence protocol (PDCP for short) entity of the sender starts the discard timer for the SDU, when the discard timer corresponding to the SDU expires, the PDCP entity deletes the SDU and the PDU corresponding to the SDU.

However, in the above solution, the packet discard timer is based on a DRB granularity, that is, all data packets belonging to the same DRB use the same discard timer, when service characteristics in the DRB are quite different, the discard timer of the existing DRB granularity obviously cannot meet data packet deleting demands of various services.

SUMMARY

The embodiments of the present application provide a data packet deleting method, a device and a storage medium. By setting a discard timer with a smaller granularity (that is, a first discard timer based on a QoS flow granularity), data packet deleting demands of different services can be satisfied.

In a first aspect, an embodiment of the present application may provide a data packet deleting method, the method includes:

when a protocol layer entity of a sender receives a service data unit SDU from a higher layer, determining a quality of service QoS flow to which the SDU belongs;

when the QoS flow to which the SDU belongs is a first QoS flow, starting, by the protocol layer entity, a first discard timer corresponding to the first QoS flow; and when the first discard timer expires, deleting, by the protocol layer entity, the SDU and a PDU corresponding to the SDU.

In a second aspect, an embodiment of the present application may provide a data packet deleting method, the method includes:

when a protocol layer entity of a sender receives a service data unit SDU from a higher layer, determining a quality of service QoS flow to which the SDU belongs;

when the QoS flow to which the SDU belongs is a first QoS flow, determining, by the protocol layer entity, a reference discard timer, wherein the reference discard timer is a first discard timer corresponding to the first QoS flow or a second discard timer, and the second discard timer corresponds to a data radio bearer DRB to which the first QoS flow is mapped;

starting, by the protocol layer entity, the reference discard timer; and when the reference discard timer expires, deleting, by the protocol layer entity, the SDU and a PDU corresponding to the SDU.

In a third aspect, an embodiment of the present application may provide a sender which includes:

a protocol layer entity, configured to receive a service data unit SDU from a higher layer;

a determining module, configured to determine a quality of service QoS flow to which the SDU belongs;

the protocol layer entity is further configured to: start a first discard timer corresponding to a first QoS flow when the QoS flow to which the SDU belongs is the first QoS flow; and delete the SDU and a PDU corresponding to the SDU when the first discard timer expires.

In a fourth aspect, an embodiment of the present application may provide a sender which includes:

a protocol layer entity, configured to receive a service data unit SDU from a higher layer;

a determining module, configured to determine a quality of service QoS flow to which the SDU belongs;

the protocol layer entity is further configured to: determine a reference discard timer, start the reference discard timer, and delete the SDU and a PDU corresponding to the SDU when the reference discard timer expires, wherein the reference discard timer is a first discard timer corresponding to the first QoS flow or a second discard timer, and the second discard timer corresponds to a data radio bearer DRB to which the first QoS flow is mapped.

In a fifth aspect, an embodiment of the present application may provide a sender which includes:

a processor, a memory, and an interface for communicating with other devices;

the memory stores computer-executable instructions;

the processor executes the computer-executable instructions stored in the memory, so that the processor executes the data packet deleting method as described in the first aspect.

In a sixth aspect, an embodiment of the present application may provide a sender which includes:

a processor, a memory, and an interface for communicating with other devices;

the memory stores computer-executable instructions;

the processor executes the computer-executable instructions stored in the memory, so that the processor executes the data packet deleting method as described in the second aspect.

In a seventh aspect, an embodiment of the present application may provide a computer-readable storage medium, the computer-readable storage medium stores a computer-executable instruction which, when executed by a processor, is used for implementing the data packet deleting method as described in the first aspect.

In an eighth aspect, an embodiment of the present application may provide a computer-readable storage medium, the computer-readable storage medium stores a computer-executable instruction which, when executed by a processor, is used for implementing the data packet deleting method as described in the second aspect.

In a ninth aspect, an embodiment of the present application provides a program which, when executed by a processor, is used for implementing the data packet deleting method as described in the first aspect.

In a tenth aspect, the embodiment of the present application also provides a program which, when executed by a processor, is used for implementing the data packet deleting method as described in the second aspect.

In an eleventh aspect, an embodiment of the present application also provides a computer-program product which includes program instructions, the program instructions are used for implementing the data packet deleting method as described in the first aspect.

In a twelfth aspect, an embodiment of the present application also provides a computer-program product which includes program instructions, the program instructions are used for implementing the data packet deleting method as described in the second aspect.

In a thirteenth aspect, an embodiment of the present application also provides a chip which includes a processing module and a communication interface, the processing module can implement the data packet deleting method as described in the first aspect.

Further, the chip also includes a storage module (a memory for example), the storage module is used for storing instructions, the processing module is used for executing the instructions stored in the storage module, and execution of the instructions stored in the storage module causes the processing module to implement the data packet deleting method as described in the first aspect.

In a fourteenth aspect, an embodiment of the present application also provides a chip which includes a processing module and a communication interface, the processing module can implement the data packet deleting method as described in the second aspect.

Further, the chip also includes a storage module (a memory for example), the storage module is used for storing instructions, the processing module is used for executing the instructions stored in the storage module, and execution of the instructions stored in the storage module causes the processing module to implement the data packet deleting method as described in the second aspect.

The present application provides a data packet deleting method, a device and a storage medium, including: when a protocol layer entity of a sender receives an SDU from a higher layer, determining a QoS flow to which the SDU belongs, and when the QoS flow to which the SDU belongs is a first QoS During the now, the protocol layer entity starts a first discard timer corresponding to the first QoS flow, and when the first discard timer expires, the protocol layer entity deletes the SDU and a PDU corresponding to the SDU. By defining a first discard timer with a smaller granularity, a first discard timer with a QoS flow granularity, for the protocol layer, deletion of a data packet can be performed according to QoS flow characteristics of a service, thereby satisfying the data packet deleting demands for QoS flows with different characteristics under the circumstance that a storage space saving demand of the sender is satisfied.

BRIEF DESCRIPTION OF DRAWINGS

The drawings here are incorporated into the specification and constitute a part of the specification, and show the embodiments in accordance with the present application, and together with the specification are used to explain the principle of the present application.

Specific embodiments of the present application have been shown by the above-mentioned drawings, and will be described in detail further below. These drawings and text descriptions are not intended to limit the scope of the concept of the present inventive in any way, but to explain the concept of the present application to those skilled in the art by referring to particular embodiments.

DESCRIPTION OF EMBODIMENTS

In order to make the objects, technical solutions, and advantages of embodiments of the the present application more clear, in the following, the technical solutions in the embodiments of the present application will be clearly and completely described with reference to the drawings in the embodiments of the present application, obviously, the described embodiments are intended to be a part of, but not all of the embodiments of the the present application. Based on the embodiments in the present application, all other embodiments obtained by those of ordinary skill in the art without paying creative effort are within the scope of the present application.

Terms "first", "second", etc., in the specification, a claim, and drawings described above of the embodiments in the present application are used to distinguish similar objects, and are not necessary to be used to describe a specific order or sequence. It should be understood that data thus used may be interchanged under an appropriate circumstance, so that the embodiments of the present application described herein can be implemented in an order other than those illustrated or described herein. In addition, terms "including" and "having" and any variations thereof are intended to cover non-exclusive inclusion. For example, a process, a method, a system, a product, or a device including a series of steps or units are not necessary to be limited to those steps or units clearly listed, but may include other steps or units not clearly listed or inherent to the process, the method, the product, or the device.

Figure 1:
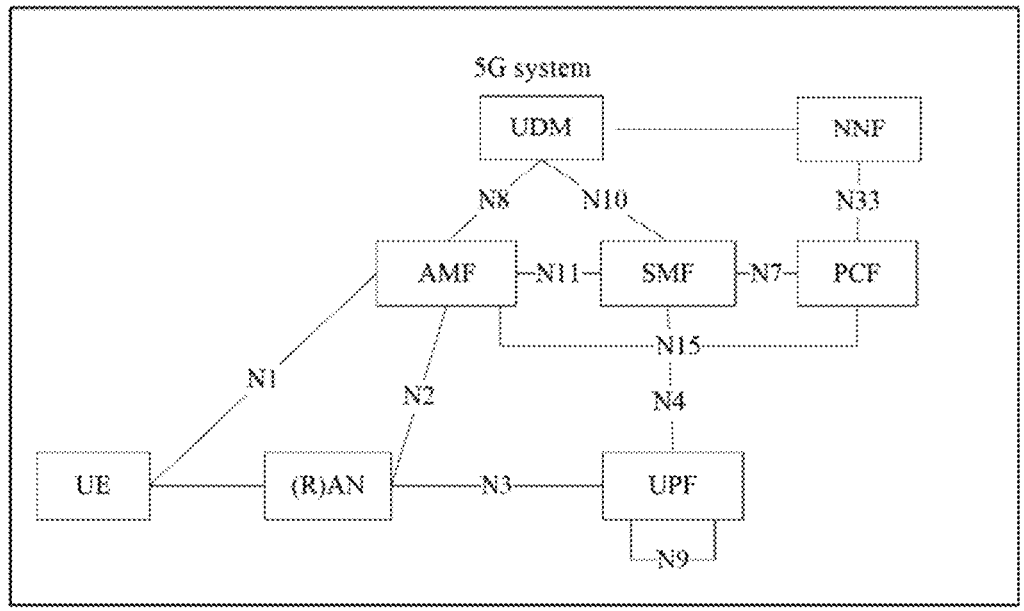
FIG. 1 is a schematic diagram of an architecture of a 5G system.

Embodiments of the present application provide a data packet deleting method, which is used for deleting SDUs and PDUs received by a protocol layer entity of a sender. The method of the present application can be applied to a 5 generation mobile communication (5G for short) system, the 5G system is also known as a New Radio (NR for short) or Next Generation of Mobile Communication System. As shown in FIG. 1, the 5G system includes: a user equipment (UE for short), an access network (AN for short) and a core network. The UE accesses the core network through the access network.

UE is also known as terminal device or terminal, the terminal device can be: a mobile phone, a computer, or can be a cell phone, a cordless phone, a session initiation protocol (SIP for short) phone, a smart phone, a wireless local loop (WLL for short) stations, a personal digital assistant (PDA for short), a laptop, a handheld communication device, a handheld computing device, a satellite wireless device, a wireless modem card, a set top box (STB for short), an in-vehicle device, a wearable device, a smart home device, an industrial device, other devices used for communication on wireless systems, etc.

The AN in the 5G system can be a radio access network (RAN for short) or wired AN, and the AN device (RAN device or wired AN device) in the 5G system can be composed of multiple 5G-AN nodes. The 5G-AN node may include: an access point (AP for short) of a non-3GPP access network (such as an access point of a WiFi network), and a next generation base station. The next generation base stations can be collectively referred to as the next generation wireless access network node (NG-RAN node). The next generation base stations include a new air interface base station (gNB for short), a next generation evolved node base station (NG-eNB), a gNB in a separated configuration, etc. (a central unit (CU for short) and a distributed unit (DU for short)), a transmission receive point (TRP for short) a transmission point (TP for short) or other nodes.

The core network of the 5G system includes multiple functional units such as access and mobility management function (AMF for short) network elements, session management function (SMF for short) network elements, and user plane function (UPF for short) network elements, authentication server function (AUSF for short) network elements, policy control function (PCF for short) network elements, application function (AF for short) network elements, unified data management (UDM for short) network elements, network slice selection function (NSSF for short) network elements.

The AMF network element is mainly responsible for services such as mobility management and access management. The SMF network element is mainly responsible for session management, UE address management and allocation, dynamic host configuration protocol functions, the selection and control of user plane functions, etc. UPF is mainly responsible for externally connecting to a data network (DN for short) and the routing and forwarding of data packets on the user plane, message filtering, and performing quality of service (QoS for short) control related functions. The AUSF is mainly responsible for authentication functions of the terminal device, etc. The PCF network element is mainly responsible for providing a unified policy framework for network behavior management, providing policy rules for control plane functions, and acquiring, registration information related to policy decisions. It should be noted that these functional units can work independently, or they can be combined to achieve certain control functions, for example, access control and mobility management functions such as access authentication for the terminal device, security encryption, location registration, etc., and session management functions such as establishment, release and modification of a user plane transmission path.

The functional units in the 5G core network can communicate with each other through next generation network (NG for short) interfaces. For example, the UE can implement transmission of a control plane message via an NG interface 1 (N1 for short), and the RAN device can establish a user plane data transmission channel with the UPF via an NG interface 3 (N3 for short), and the AN/RAN device can establish a control plane signaling connection with the AMF network element via an NG interlace 2 (N2 for short), and the UPF can exchange information with the SMF network element via an NG interface 4 (N4 for short), and the UPF can exchange user plane data with the data network DN via an NG interface 6 (N6 for short), and the AMF network element can exchange information with the SMF network element via an NG interface 11 (N11 for short), and the SMF network element can exchange information with the PCF network element via an NG interface 7 (N7 for Short), and the AMF network element can exchange information with the AUSF via an NG interface 12 (N12 for short). It should be noted that FIG. 1 is only an exemplary architecture diagram. In addition to the functional units shown in FIG. 1, the network architecture may also include other functional units.

The method in the embodiments of the present application may be executed by a UE or an access network device (for example, a base station) in a 5G system. The following solution is described by taking the UE and the base station as the sender as an example.

In the traditional solution, when receiving a PDCP service data unit (SDU for short) sent by an upper layer, a PDCP layer entity of a sender may add a discard timer for the PDCP SDU, and when the discard timer corresponding to the PDCP SDU expires, or, the PDCP entity confirms that the PDCP SDU has been successfully sent, the PDCP entity then deletes the SDU and the PDU corresponding to the SDU. In the traditional solution, the discard timer is set for a DRB, that is, all the SDUs transmitted on the same DRB use the same discard timer.

However, the SDUs transmitted on the same DRB may belong to different services, or may have different QoS requirements and other characteristics. When the service characteristics of the SDUs transmitted on the DRB are quite different, the existing discard timer with DRB granularity obviously cannot meet the data packet deleting demands of various services. For example, data packets of some services are related, and this kind of data packets need to be reserved for a long time, so that subsequent data packets can perform operations, like acquiring related information, according to previous data packets. However, data packets of some services are not related, these data packets do not need to be reserved for a long time and can be deleted earlier, so that the storage space of the sender can be saved. For example, although transmission delay times of the data packets of some services reach a packet delay budget (PDB for short), if no affect would be caused to packets of other flows when these packets continue to be transmitted, or other attributions of these packets are still satisfied, also, this type of data packets can not be deleted, thus achieving different processing flexibility and effectiveness for data packets of different service flows.

In the 5G system, a flow-based QoS architecture is proposed. QoS flow is a QoS distinction of certain granularity in a protocol data unit (PDU the short) session. QoS parameter requirements correspond to different QoS flows can be different. Data packets mapped to the same QoS flow may be processed according to the same QoS requirements. A QoS flow can be distinguished by virtue of a QoS flow identifier (QFI for short). In a mapping relationship between radio bearers and QoS flows, one QoS flow can be mapped to one radio bearer, and one radio bearer can bear multiple different QoS flows. Radio bearers include a signaling radio bearer (SRB for short) and a DRB.

Based on the idea of QoS flow, the present application proposes a QoS flow-based data packet deleting mechanism, that is, it defines a discard timer with QoS flow granularity. When receiving an SDU from a higher layer, a protocol layer entity of a sender may turn on a discard timer with QoS flow granularity, and delete the SDU and a PDU corresponding to the SDU when the discard timer with QoS flow granularity expires.

In the QoS flow-based data packet deleting mechanism, discard timers with QoS flow granularity which have different timing durations can be set for different QoS flows, so that the data packet deleting demands of different services can be satisfied. For example, if data packets of some QoS flows are related and need to be reserved for a longer period of time, then a longer timing duration can be set for the discard timer of the QoS flow. If data packets of some QoS flows are not related and don't need to be reserved for a longer period of time, then a shorter timing duration can be set for the discard timer of the QoS flow.

The discard timer with QoS flow granularity proposed in the present application can exist alone, that is, the discard timer with QoS flow granularity is adopted to replace the existing discard timer with DRB granularity. The discard timer with QoS flow granularity can also exist at the same time with the existing discard timer with DRB granularity. Hereinafter, the discard timer with QoS flow granularity is referred to as a first discard timer, and the discard timer with DRB granularity is referred to as a second discard timer. It should be noted that the timer involved in the embodiments of the present application is only a particular implementation, and the timer can be represented in the form of duration. For example, the first discard timer and the second discard timer can also be represented by a first discard duration and a second discard duration.

When the two kinds of timers exist at the same time, in one approach, the sender can ignore the discard timer with DRB granularity, and only delete a data packet according to the discard timer with QoS flow granularity.

In another approach, the sender defines specific behaviors of a UE when both timers exist at the same time, thus ensuring that data packet deleting operations don't conflict. The specific behaviors of the UE when two kinds of timers exist at the same time will be particularly introduced in the following embodiments.

It should be clear that the method in the embodiments of the present application can be applied to a particular UE, a particular bearer, a particular QoS flow or a QoS flow list, or can also be applied to any UE any bearer, or any QoS flow. For example, a base station can configure a data packet deleting operation based on the QoS flow granularity for a particular portion of UEs in a cell, and can also configure a data packet deleting operation based on the QoS flow granularity for all UEs in a the cell. Or, for a certain UE, the UE may have multiple bearers. The UE can perform the data packet deleting operation based on the QoS flow granularity for all bearers, or only perform the data packet deleting operation based on the QoS flow granularity for a particular portion of bearers. Similarly, the UE may have multiple QoS flows. The UE can perform the data packet deleting operation based on the QoS flow granularity for all the QoS flows, or only perform the data packet deleting operation based on the QoS flow granularity for a particular portion of QoS flows. The base station may determine how to configure the deleting approach of the packet according to capability reporting from the UE.

Figure 2:
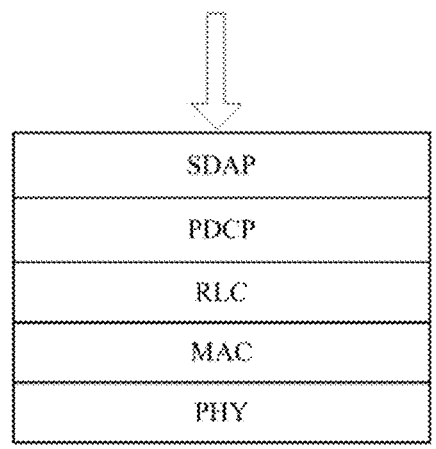
FIG. 2 is a schematic diagram of a protocol layer of a UE.

Taking the UE as the sender as an example. A protocol layer of the UE is shown in FIG. 2. A protocol stack of the UE is, in turn, from high to low: a service data adaptation protocol (SDAP for short) layer, a PDCP layer, a radio link control (RLC for short) layer, a media access control (MAC for short) layer, and a physical layer (PHY for short). For functions of these protocol layers, reference can be made to specific descriptions of these protocol layers in the LTE/NR technical specifications, which will not be repeated.

For a certain protocol layer, upper and lower layers of the protocol layer are relative. Taking the PDCP layer as an example, the upper layer of the PDCP layer is the SDAP layer, and the lower layer of the PDCP layer is the RLC layer. Taking the RLC layer as an example, the upper layer of the RLC layer is the PDCP layer, and the lower layer of the RLC layer is the MAC layer.

The architecture of the protocol stack shown in FIG. 2 is only an example, and the UE may also include more protocol layers. For example, the SDAP layer also has a higher layer. It can be understood that the protocol layer of the UE may vary with different protocols used. For example, when the protocol used by the UE is a non-3GPP link, the RLC layer can be replaced with a logical link control (LLC for short) layer, a MAC layer, an Ethernet layer, etc. Similarly, when the sender is other devices, the protocol stack of the sender may also be different from that shown in FIG. 2.

The QoS flow is identified by the QFI. In existing protocols, the SDAP layer usually adds the QFI for the QoS flow. When receiving data packets from the upper layer, the SDAP layer maps the data packets to different DRBs according to the characteristics of the data packets, and then add QFIS to the data packets so that the lower layer can identify QoS flows according to the QFIs.

Figure 3:
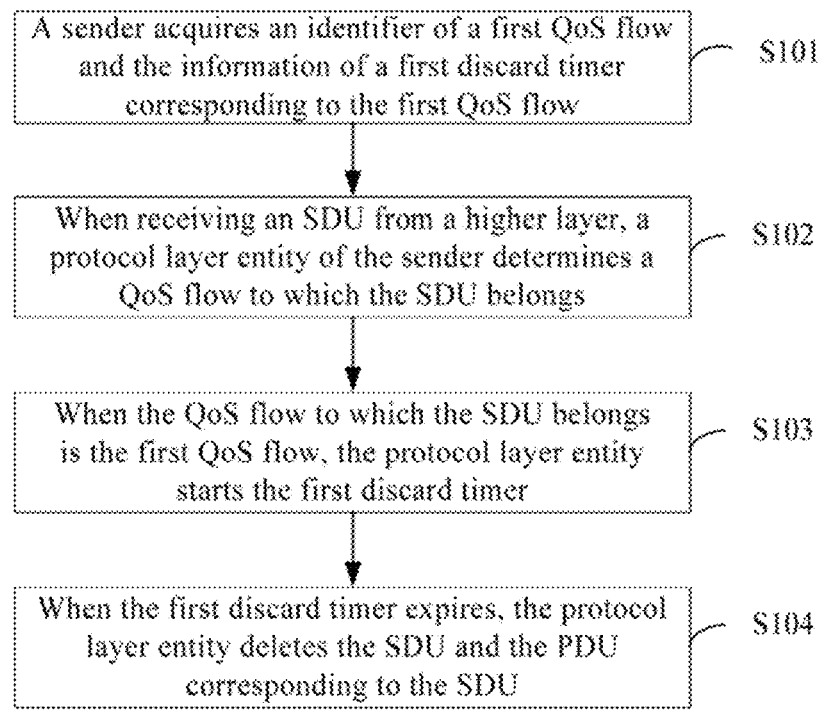
FIG. 3 is a flowchart of a data packet deleting method provided by Embodiment 1 of the present application.

FIG. 3 is a flowchart of a data packet deleting method provided by Embodiment 1 of the present application, as shown in FIG. 3, the method provided. In this embodiment includes the following steps:

S101, a sender acquires an identifier of a first QoS flow and information of a first discard timer corresponding to the first QoS flow.

Step S101 is an optional step, and the first discard timer corresponding to the first QoS flow can also be understood as the first discard timer used by the first QoS flow. Where the information of the first discard timer includes a timing duration of the first discard timer, and may also include an identifier of the first discard timer. The timing duration of the first discard timer may be less than 10 ms (millisecond), for example, 1 ms or 0.5 ms.

The first discard timer is different from a traditional discard timer. The traditional discard timer is a timer with DRB granularity or is a DRB level timer. In this embodiment of the present application, the first discard timer is a timer with QoS flow granularity (or called as a QoS flow level timer). Under normal conditions, a DRB includes multiple QoS flows. In the prior art, multiple QoS flows included in a DRB use the same discard timer for data packet deleting, white in the embodiment of the present application, multiple QoS flows included in a DRB may use different discard timers for data packet deleting, or multiple QoS flows included in a DRB are divided into different groups, and different groups can use different discard timers for data packet deleting, so as to satisfy the demands of QoS flows with different characteristics for data packet deleting.

The sender may be a base station or a UE, and the sender may acquire the identifier of the first QoS flow and the information of the first discarding timer in the following ways.

Approach 1: the sender receives a first message sent by a network device, where the first message includes the identifier of the first QoS flow and the information of the first discard timer.

The first message may be an existing radio resource control (RRC for short) message. For example, a PDCP-config message may also be a newly defined dedicated message. The dedicated message is dedicated to sending the identifier of the first QoS flow and the information of the first discard timer used by the first QoS flow.

The first message may carry an identifier of the first QoS flow, and may also carry identifiers of multiple first QoS flows.

Approach 2: the sender receives a first message sent by the network device, where the first message includes the identifier of the first QoS flow. The information of the first discard timer is predefined, or the UE determines the information of the first discard timer according to an acquired QoS parameter, the QoS parameter being acquired by the sender from a non-access stratum (NAS for short) message or from the network device, where the determining the information of the first discard timer includes determining the timing duration of the first discarding timer.

The difference between Approach 2 and Approach 1 is that the first message only includes the identifier of the first QoS flow, and does not include the information of the first discard timer, and the information of the first discard timer is determined by the sender itself.

Approach 3: the sender receives a first message sent by the network device, where the first message includes an identifier list of QoS flows and the information of the first discard timer, and the identifier list of QoS flows includes identifiers of multiple first QoS flows.

In this approach, the base station can instruct the UE to perform QoS flow-based packet deleting operations on multiple QoS flows through one message.

In this approach, the first message may include information of one or more first discard timers. When the first message only includes information of one first discard timer, it indicates that multiple QoS flows included in the identifier list of QoS flows use the same first discard timer.

The number of information of the first discard timer included in the first message may be equal to or less than the number of QoS flows included in the identifier list of QoS flows.

When the number of information of the first discard timer included in the first message is equal to the number of QoS flows included in the identifier list of QoS flows, a base station may assign a first discard timer for each QoS flow in the identifier list of QoS flows, and the first discard timers used by the QoS flows are different.

When the number of information of the first discard timer included in the first message is less than the number of QoS flows included in the identifier list of QoS flows, the base station may assign the same first discard timer for a portion of QoS flows in the identifier list of QoS flows, and assign a different first discard timer for the remaining QoS flows.

Approach 4: the sender receives a first message sent by the network device, where the first message includes the identifier list of QoS flows, and the identifier list of QoS flows includes identifiers of multiple first QoS flow. The information of the first discard timer is predefined, or the sender determines the information of the first discard timer according to an acquired QoS parameter, the QoS parameter being acquired by the sender from a non-access NAS message or from the base station, where the determining the information of the first discard timer includes determining the timing duration of the first discarding timer.

Where the first discard timers corresponding to the multiple first QoS flows may be the same or may be different.

Approach 5: the sender receives a first message sent by the network device, where the first message includes an identifier list of QoS flows, and the identifier list of QoS flows includes identifiers of multiple QoS flows, the sender selects one or more first QoS flows from the multiple QoS flows.

In this approach, the information of the first discard timer corresponding to the first QoS flow may be carried in the first message, or may be predefined, or may be determined by the sender according to a QoS parameter, the QoS parameter being acquired by the sender from a non-access NAS message or from the base station.

When the sender is a UE, the network device may be a base station. When the sender is a base station, the network device may be a management device or core network device. It can be understood that the way in which the base station acquires the identifier of the first QoS flow and the information of the first discard timer is similar to that of the UE. When the sender is a base station, both of the identifier of the first QoS flow and the information of the first discarding timer can be determined by the base station.

In a possible implementation manner of the present application, the first message also includes first indication information, where the first indication information is used for indicating whether to use a QoS flow-based data packet deleting mechanism by the sender. Correspondingly, after the sender receives the first message, if the first indication information indicates the sender to use the QoS flow-based data packet deleting mechanism, the sender executes subsequent steps S102-S104 in this embodiment. If the first indication information indicates the sender to use the QoS flow-based data packet deleting mechanism, the sender does not execute the steps S102-S104 in this embodiment.

It can be understood that the first indication information may not be carried in the first message, but may be carried in other messages.

If the first message includes the first indication information, the sender determines whether to use the QoS flow-based data packet deleting mechanism according to the first indication information. If the first message does not include the first indication information, after receiving the first message, the sender determines to use the QoS flow-based data packet deleting mechanism if the first message includes the identifier of the first. QoS flow and the information of the first discard timer used by the first QoS flow.

S102, when receiving an SDU from a higher layer, the protocol layer entity of the sender determines a QoS flow to which the SDU belongs.

The protocol layer may be the PDCP layer, but is not limited to the PDCP layer. For example, it may also be the RLC layer or the SDAP layer in the protocol stack shown in FIG. 2. Taking the PDCP layer as an example. The upper layer of the PDCP layer is the SDAP layer, when receiving the SDU from the SDAP layer, the PDCP layer detects packet header information of the SDU and acquires a QFI of the QoS flow to which the SDU belongs. The QFI of the QoS flow may be added by the SDAP layer.

S103, when the QoS flow to which the SDU belongs is the first QoS flow, the protocol layer entity starts the first discard timer.

The protocol layer entity decides whether the QFI of the QoS flow to which the SDU belongs is the same as a QFI of the first QoS flow. If the QFI of the QoS flow to which the SDU belongs is the same as the QFI of the first QoS flow, it is determined that the QoS flow to which the SDU belongs is the first QoS flow. If the QFI of the QoS flow to which the SDU belongs is different from the QFI of the first QoS flow, it is determined that the QoS flow to which the SDU belongs is not the first QoS flow.

Illustratively, the protocol layer may start the first discard timer when an SDU is received, or when it is determined that the SDU belongs to the first QoS flow, or when the SDU is sent.

It should be noted that in actual application scenarios, the protocol layer entity may receive multiple SDUs belonging to the first QoS flow simultaneously or successively. Then, the protocol layer may start a first discard timer for each SDU, starting times of the first discard timers corresponding to (or associated) the SDUs are different, but the durations of the first discard timers corresponding to the SDUs in the same QoS flow are the same.

If the QoS flow to which the SDU belongs is not the first QoS flow, the protocol layer entity only starts the second discard timer. When the second discard timer expires, the protocol layer entity deletes the SDU and the PDU corresponding to the SDU. When the second discard timer expires, if the protocol layer has sent the PDU corresponding to the SDU to an under layer, the protocol layer may also instruct this lower layer to delete a data packet corresponding to the SDU. The data packet corresponding to the SDU deleted by the lower layer includes an SDU and/or a PDU of the lower layer. Specifically, if the lower layer does not perform packaging or sending of the SDU and/or PDU, the lower layer may delete the SDU and/or PDU. If the lower layer has already performed packaging or sending of the SDU and/or PDU, the lower layer may not delete the SDU and or PDU, or may also delete the SDU and/or PDU which has been packaged.

In this embodiment, the protocol layer entity may start the first discard timer when it is determined that the QoS flow to which the SDU belongs is the first QoS flow, or may start the first discard timer only under certain conditions. For example, when a transmission delay time of the SDU is greater than or equal to a PDB, the first discard timer is turned on. The PDB may be predefined of notified by the network, or may be determined by the sender itself.

S104, when the first discard timer expires, the protocol layer entity deletes the SDU and the PDU corresponding to the SDU.

For a certain protocol layer, the data packet received from the higher layer is an SDU, and the protocol layer obtains a PDU after processing the SDU. After starting a first discard timer for a certain SDU, the protocol layer monitors whether the first discard timer corresponding to the SDU expires, and deletes the SDU and the PDU corresponding to the SDU when the first discard timer corresponding to the SDU expires. When the first discard timer expires, if the protocol layer has sent the PDU corresponding to the SDU to the tinder layer, the protocol layer may also instruct the lower layer to delete the data packet corresponding to the SDU. The data packet corresponding to the SDU deleted by the lower layer includes the SDU and/or PDU of the lower layer. Specifically, if the lower layer does not perform packaging or sending of the SDU and/or PDU, the lower layer may delete the SDU and/or PDU. If the lower layer has already performed packaging or sending of the SDU and/or PDU, the lower layer may not delete the SDU and/or PDU, or may also delete the SDU and/or PDU which has been packaged.

In this embodiment, when receiving an SDU from a higher layer, a protocol layer entity of a sender determines a QoS flow to which the SDU belongs. When the QoS flow to which the SDU belongs is a first QoS flow, the protocol layer entity starts a first discard timer corresponding to the first QoS flow. When the first discard timer expires, the protocol layer entity deletes the SDU and a PDU corresponding to the SDU. Compared with the discard timer with DRB granularity used in the prior art, a first discard timer with a smaller granularity, a first discard timer with QoS flow granularity, is defined for the protocol layer in this embodiment, in this way, deletion of a data packet can be performed according to QoS flow characteristics of the service, thereby satisfying, data packet deleting demands for QoS flows with different characteristics under the circumstance that a storage space saving demand of the sender is satisfied.

Figure 4:
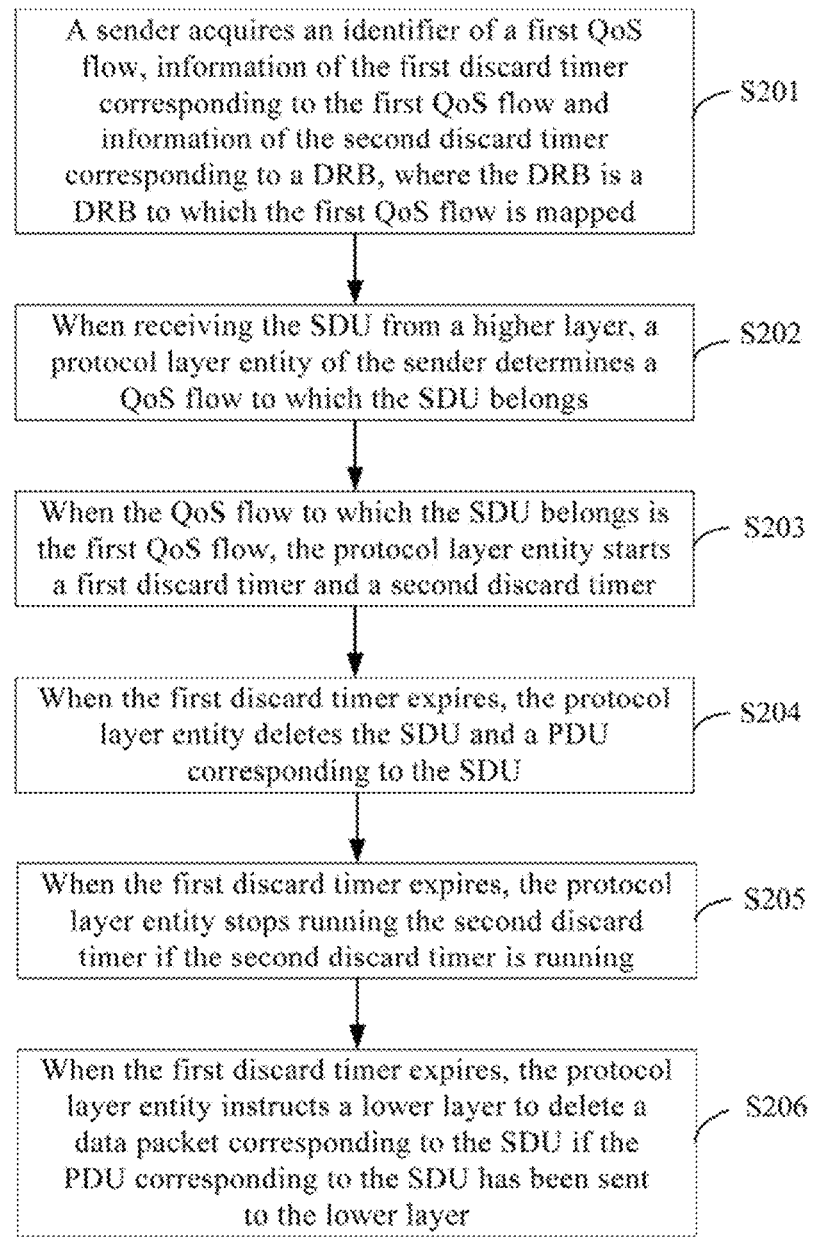
FIG. 4 is a flowchart of a data packet deleting method provided by Embodiment 2 of the present application.

FIG. 4 is a flowchart of a data packet deleting method provided in Embodiment 2 of the present application. The difference between this embodiment and Embodiment 1 is that: in this embodiment, the traditional discard timer with DRB granularity is also retained, that is, the traditional discard timer with DRB granularity and the discard timer with QoS flow granularity coexist. In this embodiment and the following embodiments, the traditional discard timer with DRB granularity is called as a second discard timer to distinguish it from the first discard timer. In this embodiment, when the first discard timer and the second discard timer coexist, specific behaviors of a sender are defined. As shown in FIG. 4, the method provided in this embodiment includes the following steps:

S201, the sender acquires an identifier of a first QoS flow, information of the first discard timer corresponding to the first QoS flow and information of the second discard timer corresponding to a DRB, where the DRB is a DRB to which the first QoS flow is mapped.

For the approach to acquire the identifier of the first QoS flow and the information of the first discard timer, reference can be made to the multiple approaches described in step S101 of Embodiment 1, and details are not described herein again.

The information of the second discard timer may be carried in a first message together with the identifier of the first QoS flow and the information of the first discard timer, and of course, it may also be carried in a different message. Alternatively, the information of the second discard timer is predefined, or determined by the sender itself, and this embodiment does not limit the acquiring approach of the second discard timer.

Step S201 is an optional step.

S202, when receiving the SDU from a higher layer, a protocol layer entity of the sender determines a QoS flow to which the SDU belongs.

S203, when the QoS flow to which the SDU belongs is the first QoS flow, the protocol layer entity starts the first discard timer and the second discard timer.

In a possible implementation manner of the present application, the protocol layer entity of the sender may also start the first discard timer when sending the SDU belonging to the first QoS flow.

For the specific implementation of steps S202 and S203, reference may be made to the description of S102 and S103 in Embodiment 1, and details are not described herein again.

If the QoS flow to which the SDU belongs does not belong to the first QoS flow, the protocol layer entity only starts the second discard timer. When the second discard timer expires, the protocol layer entity deletes the SDU and the PDU corresponding to the SDU. When the second discard timer expires, if the protocol layer has sent the PDU corresponding to the SDU to the under layer, the protocol layer may also instruct the lower layer to delete the corresponding SDU and/or PDU. If the lower layer does not perform packaging or sending of the SDU and/or PDU, the lower layer may delete the SDU and/or PDU. If the lower layer has already performed packaging or sending of the SDU and/or PDU, the lower layer may not delete the SDU and/or PDU, or may also delete the SDU and/or PDU which has been packaged.

Another implementation manner is to start the second discard timer when the protocol layer entity of the sender receives an SDU from a higher layer or sends an SDU from a higher layer.

In a possible implementation manner of the present application, when the QoS flow to which the SDU belongs is the first QoS flow, the protocol layer entity may also start the first discard timer only but not the second discard timer.

In this embodiment, the protocol layer entity may start the first discard timer when it is determined that the QoS flow to which the SDU belongs is the first QoS flow, or may start the first discard timer only under certain conditions. For example, when a transmission delay time of the SDU is greater than or equal to a PDB acquired in advance, the first discard timer is turned on. The PDB may be predefined or notified by the network, or may be determined by the sender itself.

In this embodiment, the sender not only starts the first discard timer, but also starts the second discard timer. The starting of the two discard timers enables the method in this embodiment to be compatible with the existing data packet deleting mechanism, thereby allowing the coexistence of the two kinds of packet deleting mechanisms. Besides, the QoS flow-based packet deleting mechanism of the present application can be achieved without making any changes to the existing data packet deleting mechanism, it is thus easy to be implemented and has good compatibility.

S204, when the first discard timer expires, the protocol layer entity deletes the SDU and the PDU corresponding to the SDU.

S205, when the first discard timer expires, the protocol layer entity stops running the second discard timer if the second discard timer is running.

Step S205 is an optional step. When the first discard timer expires, if the second discard timer runs, the protocol layer entity may also ignore the second discard timer rather than stopping running the second discard timer. In addition, correspondingly, after the second discard timer expires, the protocol layer entity does not perform any operation.

When the first discard timer expires, if the second discard timer does not run, where when the first discard timer expires, the second discard timer does not run includes the following two situations: (1) when the QoS flow to which the SDU belongs is the first QoS flow, the protocol layer entity does not start the second discard timer; (2) when the QoS flow to which the SDU belongs is the first QoS flow, the protocol layer entity starts the second discard timer, but the second discard timer has expired before the first timer expires. It should be noted that when the second discard timer expires, the UE ignores the event or does not perform any operation.

Step S206, when the first discard timer expires, the protocol layer entity may also instruct a lower layer to delete a data packet corresponding to the SDU if the PDU corresponding to the SDU has been sent to the lower layer.

Step S206 is also an optional step. When the first discard timer expires, if the PDU corresponding to the SDU has already been sent to the lower layer, the protocol layer entity may also not instruct the lower layer to delete the data packet corresponding to the SDU.

If the PDU corresponding to the SDU is not sent to the lower layer, the protocol layer entity deletes the SDU and the PDU corresponding to the SDU and does not perform other operations.

In this embodiment, the protocol layer entity may also instruct the lower layer to delete the data packet corresponding to the SDU. The data packet corresponding to the SDU deleted by the lower layer includes the SDU and/or PDU of the lower layer. Specifically, if the lower layer does not perform packaging or sending of the SDU and/or PDU, the lower layer may delete the SDU and/or PDU. If the lower layer has already performed packaging or sending of the SDU and/or PDU, the lower layer may not delete the SDU and/or PDU, or may also delete the SDU and/or PDU which has been packaged.

Taking the protocol layer as the PDCP layer as an example, the PDCP entity can instruct the RLC layer to delete RLC SDUs, and can also instruct the RLC layer to delete RLC PDUS.

When both step S205 and S206 are executed, there is no sequence of S205 and S206. And in a possible implementation manner, after step S204, either S205 or S206 may also be executed.

In this embodiment, when the protocol layer entity starts the first discard timer, or in the situation that the protocol layer starts the first discard timer and the second discard timer when the first discard timer expires, the protocol layer entity may delete the SDU and the PDU corresponding to the SDU.

If the protocol layer entity starts the first discard timer and the second discard timer, when the second discard timer expires, if the first timer does not expire, the protocol layer entity does not delete the SDU and the PDU corresponding to the SDU, and/or, the protocol layer entity does not instruct the lower layer to delete the PDU corresponding to the SDU.

Figure 5:
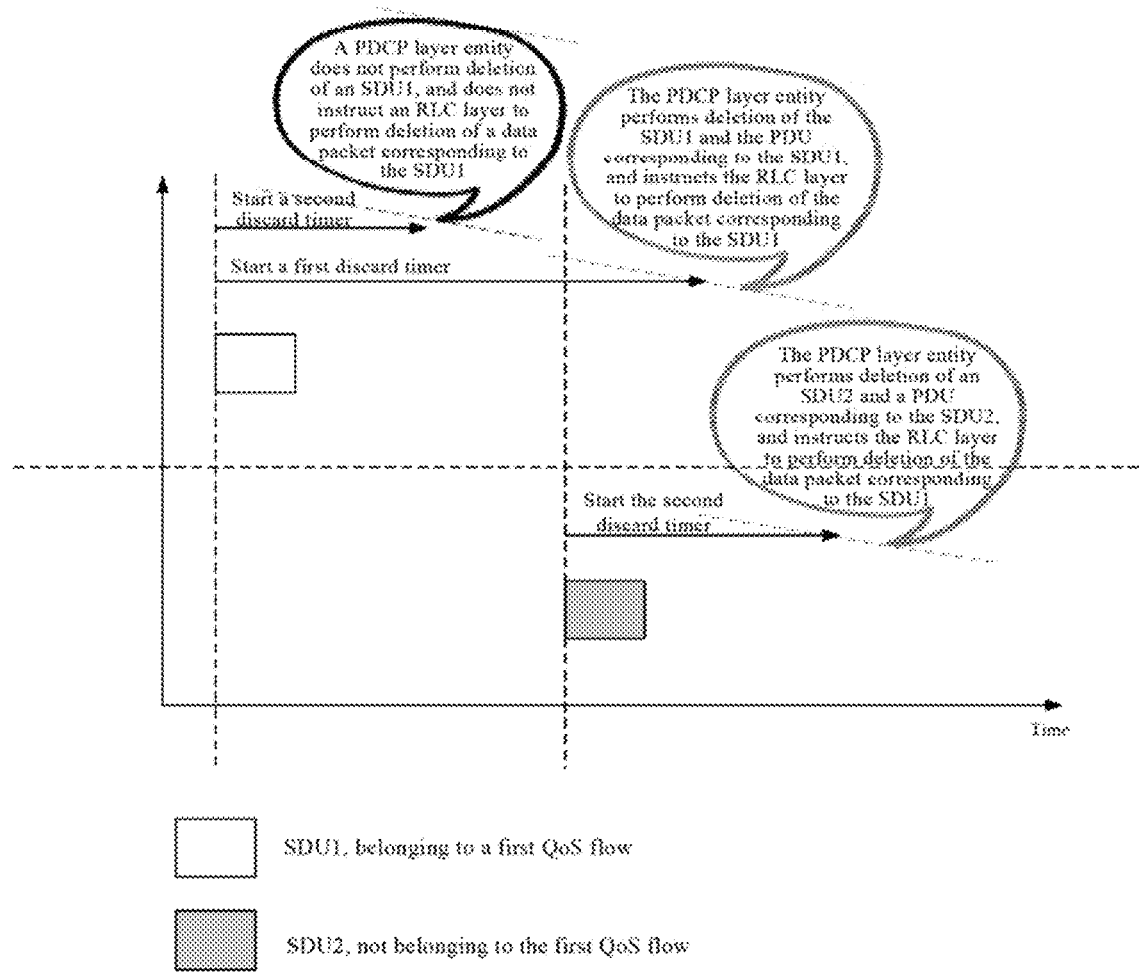
FIG. 5 is a timing schematic diagram of a protocol layer processing SDUs.

FIG. 5 is a timing schematic diagram of a protocol layer processing SDUs. FIG. 5 takes a UE as an example for illustration. As shown in FIG. 5, a PDCP layer entity of the UE receives an SDU1 at a moment t1, and the SDU1 belongs to a first QoS flow, then the PDCP layer entity starts a first discard timer and a second discard timer, where the timing duration of the first discard timer is greater than the timing duration of the second discard timer, therefore, the second discard timer may expire first. When the second discard timer expires, the PDCP layer entity does not perform deletion of the SDU1, and does not instruct the RLC layer to perform deletion of a data packet corresponding to the SDU1. When the first discard timer expires, the PDCP layer entity performs deletion of the SDU1 and a PDU corresponding to the SDU1, and instructs RLC layer to perform deletion of the data packet corresponding to the SDU1.

As shown in FIG. 5, at a moment t2, the PDCP layer of the UE receives an SDU2, and the SDU2 does not belong to the first QoS flow, and the moment t2 is before the end time of the first discard timer corresponding to the SDU1. When the SDU2 does not belong to the first QoS flow, the PDCP layer entity only starts the second discard timer, when the second discard timer expires, the PDCP layer entity performs deletion of the SDU and the PDU corresponding to the SDU, and instructs the RLC layer to perform deletion of the data packet corresponding to the SDU1.

In this embodiment, the sender acquires an identifier of the first QoS flow, information of the first discard timer used by the first QoS flow, and information of the second discard timer used by the DRB. When the QoS flow to which the received SDU belongs is the first QoS flow, the protocol layer entity starts the first discard timer and the second discard timer. When the first discard timer expires, the protocol layer entity deletes the SDU and the PDU corresponding to the SDU. When the first discard timer expires, the protocol layer entity stops running the second discard timer if the second discard timer is running. In this embodiment, when the first discard timer and the second discard timer exist at the same time, the specific behaviors of the sender are defined, thereby avoiding uncertainty of the behaviors of the sender when both kinds of discard timers exist.

Figure 6:
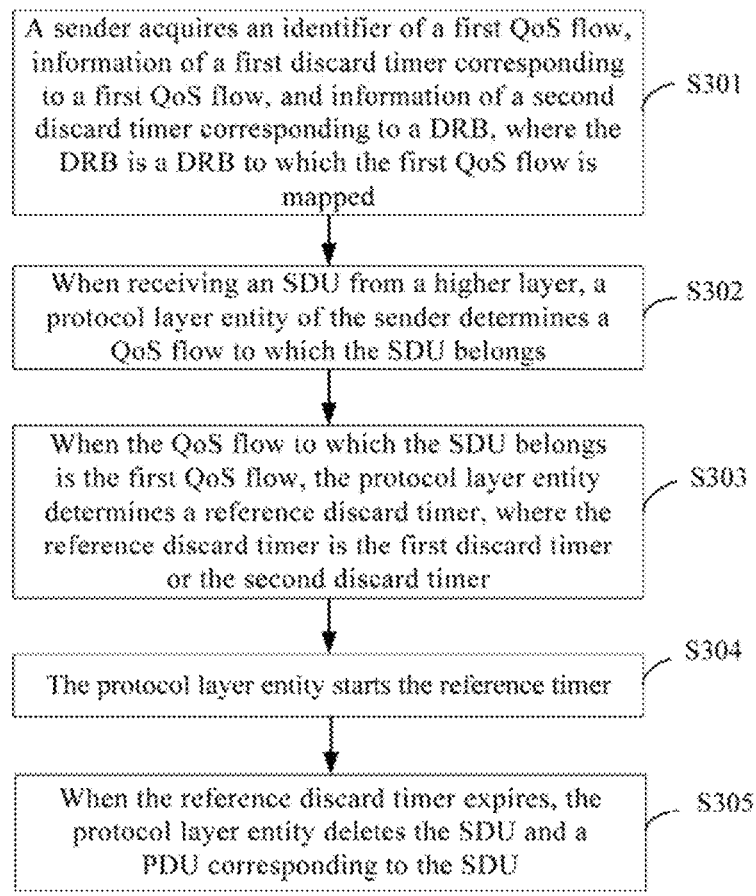
FIG. 6 is a flowchart of a data packet deleting method provided by Embodiment 3 of the present application.

FIG. 6 is a flowchart of a method for a data packet deleting method provided in Embodiment 3 of the present application. This embodiment is a scenario where a first discard timer and a second discard timer coexist. Compared with Embodiment 2, a sender of the method in this embodiment adopts a more flexible processing method. As shown in FIG. 6, the method provided in this embodiment includes the allowing steps:

S301, the sender acquires an identifier of a first QoS flow, information of the first discard timer corresponding to the first QoS flow, and information of the second discard timer corresponding to a DRB, where the DRB is a DRB to which the first QoS flow is mapped.

S302, when receiving an SDU from a higher layer, a protocol layer entity of the sender determines a QoS flow to which the SDU belongs.

Step S301 is an optional step. For the specific implementation manner of steps S301 and S302, reference may be made to relevant descriptions in Embodiment 1 and Embodiment 2, and details are not described herein again.

S303, when the QoS flow to which the SDU belongs is a first QoS flow, the protocol layer entity determines a reference discard timer, where the reference discard timer is the first discard timer or the second discard timer.

The protocol layer entity can determine the reference discard timer in the following three ways.

Approach 1: the protocol layer entity determines the reference discard timer according to a timing duration of the first discard timer and a timing duration of the second discard timer.

The sender compares the timing duration of the first discard timer and the timing duration of the second discard timer, and selects the discard timer with a longer timing duration as the reference timer from the two timers, or selects the discard timer with a shorter timing duration as the reference timer from the two timers. For example, the timing duration of the first discard timer is 20 ms, and the timing duration of the second discard timer is 10 ms, then the sender determines the first discard timer as the reference timer.

The sender may also compare an end time of the first discard timer and that of the second discard timer, and selects the discard timer whose end time is later as the reference timer, or selects the discard timer whose end time is earlier as the reference timer.

It should be noted that the starting times of the first discard timer and the second discard timer may be the same or different.

Approach 2: the protocol layer entity receives second indication information, the second indication information being used for indicating the reference discard timer used by the first QoS flow, and the protocol layer entity determines the reference discard timer from the first discard timer and the second discard timer according to the second indication information.

In this approach, other devices indicate whether the reference discard timer used by the first QoS flow is the first discard timer or the second discard timer through the second indication information.

In a possible implementation manner of the present application, the second indication information may be carried in a first message, that is, the identifier of the first QoS flow, the information of the first discard timer used by the first QoS flow, the information of the second discard timer used by the DRB, and the second indication information are all carried in the same message. Of course, the second indication information may also be separately indicated through other messages, which is not limited in this embodiment.

Approach 3: the protocol layer entity determines the reference discard timer according to a type of the data packet (for example, whether it is a data packet corresponding to the first QoS flow).

For example, when the data packet is a data packet corresponding to the first QoS flow, the protocol layer entity determines that the first discard timer is the reference discard timer.

It should be noted that Approach 3 can be used separately, or can also be used in combination with Approach 1 or Approach 2.

If the QoS flow to which the SDU belongs does not belong to the first QoS flow, the protocol layer entity only starts the second discard timer. When the second discard timer expires, the protocol layer entity deletes the SDU and a PDU corresponding to the SDU. When the second discard timer expires, the protocol layer may also instruct the lower layer to delete the data packet corresponding to the SDU if the protocol layer has sent the PDU corresponding to the SDU to the under layer. The data packet corresponding to the SDU deleted by the lower layer includes the SDU and/or PDU of the lower layer. Specifically, if the lower layer does not perform packaging or sending of the SDU and/or PDU, the lower layer may delete the SDU and/or PDU. If the lower layer has already performed packaging or sending of the SDU and/or PDU, the lower layer may not delete the SDU and/or PDU, or may also delete the SDU and/or PDU which has been packaged.

S304, the protocol layer entity starts the reference timer.

The protocol layer entity may start the reference timer when it is determined that the SUD belongs to the first QoS flow, and may also start the reference timer when the SDU is received or the SDU is sent.

In this embodiment, the protocol layer entity can only start the reference timer, and can also start the other discard timer, other than the reference discard timer, out of the first discard timer and the second discard timer, that is, the protocol layer entity starts both timers.

In this embodiment, the protocol layer entity may start the first discard timer when it is determined that the QoS flow to which the SDU belongs is the first QoS flow, or may start the first discard timer only under certain conditions. For example, when a transmission delay time of the SDU is greater than or equal to a PDB acquired in advance, the first discard timer is turned on. The PDB may be predefined or notified by the network, or may be determined by the sender itself.

Optionally, in a possible implementation manner, the protocol layer entity may also start the first discard timer and the second discard timer first, and then determine the reference timer.

S305, when the reference discard timer expires, the protocol layer entity deletes the SDU and the PDU corresponding to the SDU.

If the protocol layer entity starts the first discard timer and the second discard timer, then when the reference discard timer expires, if the other discard timer (also called as a non-reference timer), other than the reference discard timer, out of the first discard timer and the second discard timer is running, the protocol layer entity can stop running the other discard timer. Of course, the protocol layer entity may also choose to ignore the other discard timer and not perform any operation on the other discard timer. Correspondingly, after the non-reference timer expires, the terminal device does not perform any operation. When the reference discard timer expires, if the other discard timer has already stopped running, the protocol layer entity does not perform any operation on the other discard timer.

When the reference discard timer expires, if the PDU corresponding to the SDU has already been sent to the lower layer, the protocol layer entity may also instruct the lower layer to delete the PDU corresponding to the SDU.

In a possible implementation manner of the present application, when the reference timer expires, if the PDU corresponding to the SDU has already been sent to the lower layer, the protocol layer entity may also not instruct the lower layer to delete the corresponding SDU.

When the reference discard timer expires, in the situation that the PDU corresponding to the SDU is not sent to the lower layer, after deleting, the SDU and the PDU corresponding to the SDU, the protocol layer entity may not instruct the lower layer to delete the SDU.

In a possible implementation manner of the present application, the protocol layer entity may also instruct the lower layer to delete the data packet corresponding to the SDU. The data packet corresponding to the SDU deleted by the lower layer includes the SDU and/or PDU of the lower layer. Specifically, if the lower layer does not perform packaging or sending of the SDU and/or PDU, the lower layer may delete the SDU and/or PDU. If the lower layer has already performed packaging or sending of the SDU and/or PDU, the lower layer may not delete the SDU and/or PDU, or may delete the SDU and/or PDU which has been packaged.

Taking the protocol layer as the PDCP layer as an example, the PDCP entity can instruct the RLC layer to delete RLC SDUs, and can also instruct the RLC layer to delete RLC PDUs.

In this embodiment, when the protocol layer entity only starts the reference timer, or in the situation that the protocol layer starts the first discard timer and the second discard timer, when the reference tuner expires, the protocol layer entity may delete the SDU and the PDU corresponding to the SDU.

Figure 7:
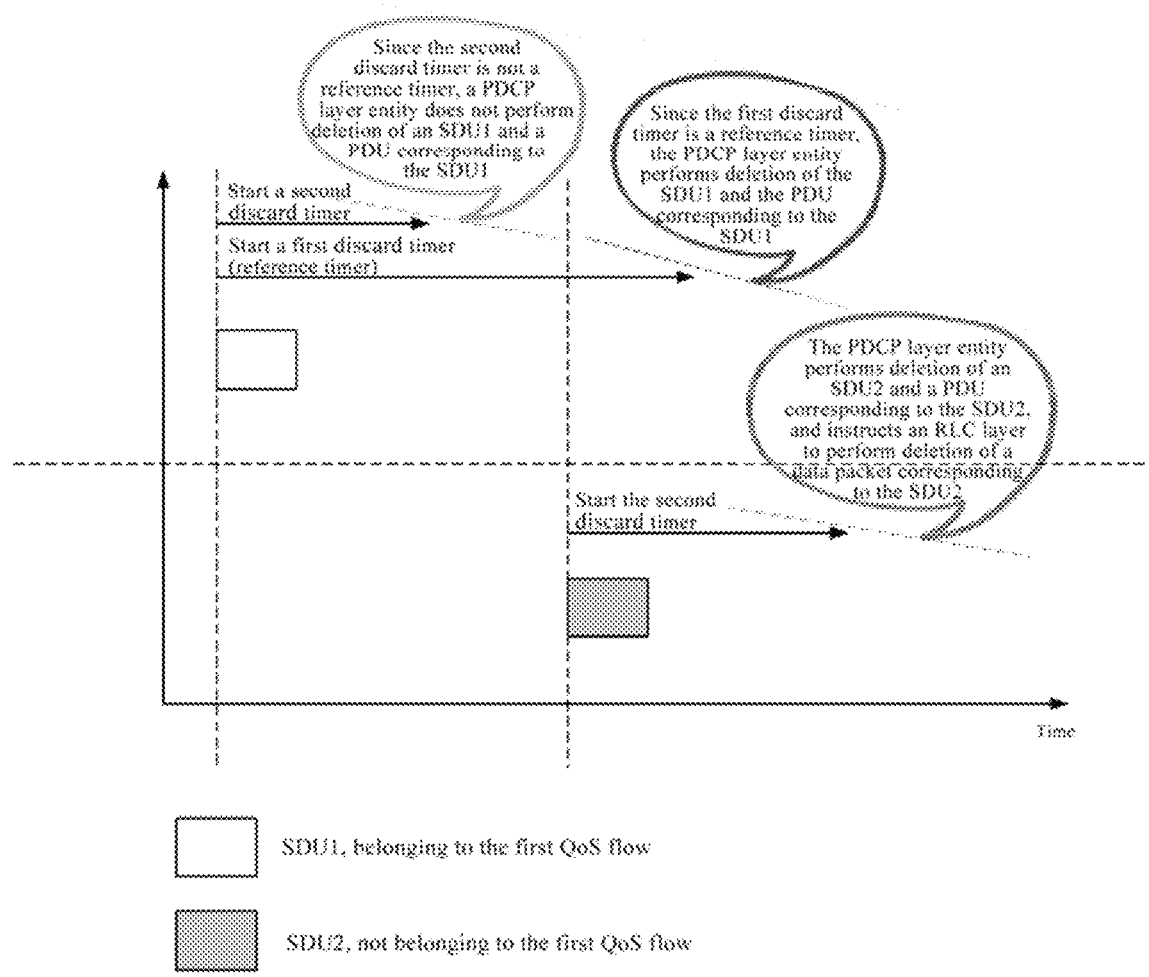
FIG. 7 is another timing schematic diagram of a protocol layer processing SDUs.

FIG. 7 is another timing schematic diagram of a protocol layer processing SDUs. FIG. 7 takes a UE as an example for illustration. As shown in FIG. 7, a PDCP layer entity of the UE receives an SDU1 at a moment t1, and the SDU1 belongs to a first QoS flow, then the PDCP layer entity determines a first discard timer to be a reference timer, and starts the first discard timer and a second discard timer. Where a timing duration of the first discard timer is greater than a timing duration of the second discard timer, therefore, the second discard timer may expire first. When the second discard timer expires, since the second discard timer is not a reference timer, the PDCP layer entity does not perform deletion of the SDU1, and does not instruct the RLC layer to perform deletion of a data packet corresponding to the SDU1. When the first discard timer expires, since the first discard timer is a reference timer, the PDCP layer entity performs deletion of the SDU and a PDU corresponding to the SDU, and instructs the RLC layer to perform deletion of the data packet corresponding to the SDU1.

As shown in FIG. 7, at a moment t2, the PDCP layer of the UE receives an SDU2, and the SDU2 does not belong to the first QoS flow, and the moment t2 is before an end time of the first discard timer corresponding to the SDU1. When the SDU2 does not belong to the first QoS flow, the PDCP layer entity only starts the second discard timer, when the second discard timer expires, the PDCP layer entity performs deletion of the SDU and the PDU corresponding to the SDU, and instructs the RLC layer to perform deletion of the data packet corresponding to the SDU1.

In this embodiment, when receiving an SDU from a higher layer, a protocol layer entity of a sender determines a QoS flow to which the SDU belongs. When the QoS flow to which the SDU belongs is a first QoS flow, the protocol layer entity determines a reference discard timer, where the reference discard timer is a first discard timer corresponding to the first QoS flow or the second discard timer, and the second discard timer corresponds to a data radio bearer DRB to which the first QoS flow is mapped. The protocol layer entity starts the reference timer, when the reference discard timer expires, the protocol layer entity deletes the SDU and a PDU corresponding to the SDU. In this solution, the sender can flexibly select a reference timer for the QoS flow from the first discard timer or the second discard timer, thus making the processing of the sender more flexible.

Figure 8:
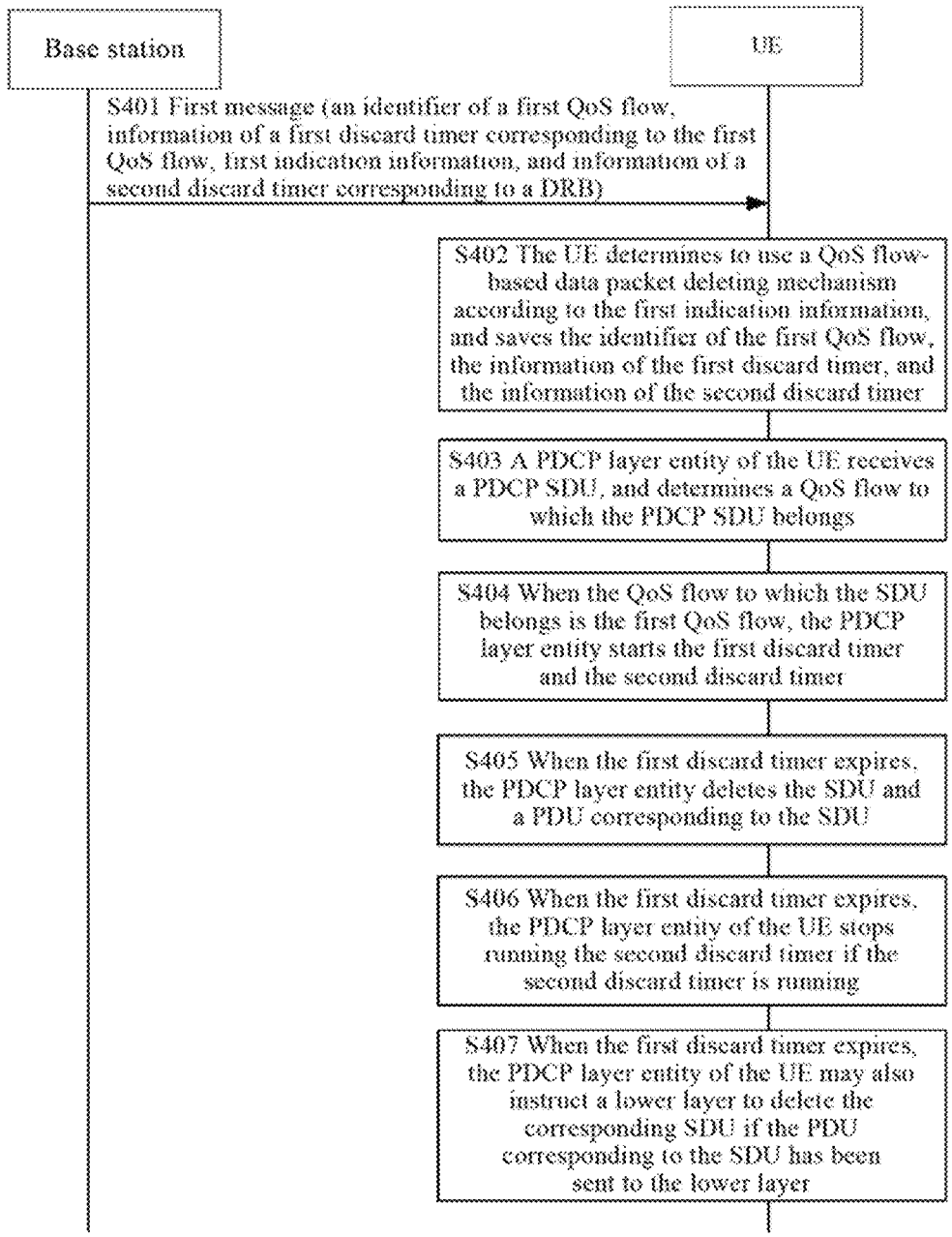
FIG. 8 is a signaling flowchart of a data packet deleting method provided by Embodiment 4 of the present application.

FIG. 8 is a signaling flowchart of a method for a data packet deleting method provided in Embodiment 4 of the present application. In this embodiment, an example is taken for description where a sender is a UE, a protocol layer entity is a PDCP layer entity, and a first discard timer and a second discard timer coexist. As shown in FIG. 8, the method provided in this embodiment includes the following steps:

S401, a base station sends a first message to the UE, where the first message includes: an identifier of a first QoS flow, information of the first discard timer corresponding to the first QoS flow, first indication information, and information of the second discard timer corresponding to a DRB.

The first message may be an RRC message, for example, a PDCP-config message.

Where the DRB in the first message is a DRB to which the first QoS flow is mapped. The first indication information is used for indicating whether to use a QoS flow-based data packet deleting mechanism by the UE.

S402, the UE determines to use the QoS flow-based data packet deleting mechanism according to the first indication information, and saves the identifier of the first QoS flow, the information of the first discard timer, and the information of the second discard timer.

After the UE receives the first message, if the first indication information indicates the UE to use the QoS flow-based data packet deleting mechanism, then the UE determines to use the QoS flow-based data packet deleting mechanism, and saves the identifier of the first QoS flow, the information of the first discard timer, and the information of the second discard timer.

If the first indication information indicates the UE not to use the QoS flow-based data packet deleting mechanism, then the UE determines not to use the QoS flow-based data packet deleting mechanism, and uses a DRB-based data packet deleting mechanism by default, and the UE may only save the information of the second discard timer.

S403, the PDCP layer entity of the UE receives a PDCP SDU, and determines a QoS flow to which the PDCP SDU belongs.

The PDCP layer entity of the UE receives a PDCP SDU from a higher layer (that is, the SDAP layer), detects a packet header of the PDCP SDU to acquire a QFI, the QoS flow corresponding to the acquired QFI is the QoS flow to which the PDCP SDU belongs.

S404, when the QoS flow to which the SDU belongs is the first QoS flow, the PDCP layer entity of the UE starts the first discard timer and the second discard timer.

Optionally, in a possible implementation manner of the present application, the PDCP layer entity of the UE may also starts the first discard timer only but not the second discard timer.

S405, when the first discard timer expires, the PDCP layer entity of the UE deletes the SDU and a PDU corresponding to the SDU.

S406, when the first discard timer expires, the PDCP layer entity of the UE stops running the second discard timer if the second discard timer is running.

Step S406 is an optional step. When the first discard timer expires, if the second discard timer runs, the PDCP layer entity may also ignore the second discard timer rather than stopping running the second discard timer. Correspondingly, when the second discard timer expires, the UE does not perform any operation.

When the first discard timer expires, if the second discard timer does not run, where when the first discard timer expires, the second discard timer does not run includes the following two situations: (1) when the QoS flow to which the SDU belongs is the first QoS flow, the PDCP layer entity does not start the second discard timer; (2) when the QoS flow to which the SDU belongs is the first QoS flow, the PDCP layer entity starts the second discard timer, but the second discard timer has expired before the first timer expires. It should be noted that when the second discard timer expires, the UE ignores the event or does not perform any operation.

S407, when the first discard timer expires, the PDCP layer entity of the UE may also instruct the lower layer to delete the corresponding SDU if the PDU corresponding to the SDU has been sent to the lower layer.

Step S407 is also an optional step. When the first discard timer expires, if the PDU corresponding to the SDU has already been sent to the lower layer, the PDCP layer entity may also not instruct the lower layer to delete the corresponding SDU. When the lower layer of the PDCP layer is the RLC layer, the PDCP layer entity may instruct the RLC layer to delete RLC SDUs, and may also instruct the RLC layer to delete RLC PDUs.

In a possible implementation manner of the present application, the PDCP layer entity of the UE also instructs the lower layer to delete a data packet corresponding to the SDU. The data packet corresponding to the SDU deleted by the lower layer includes the SDU and/or PDU of the lower layer. When the lower layer of the PDCP layer is the RLC layer, if the RLC layer does not perform packaging or sending of the SDU and/or PDU, the RLC layer may delete the SDU and/or PDU. If the RLC layer has already performed packaging or sending of the SDU and/or PDU, the RLC layer may not delete the SDU and/or PDU, or may also delete the SDU and/or PDU which has been packaged.

Correspondingly, if the RLC layer has already performed packaging or sending of the SDU and/or PDU, the RLC layer may also delete the SDU and/or PDU which has been packaged.

When the first discard timer expires, if the PDU corresponding to the SDU is not sent to the lower layer, the protocol layer entity deletes the SDU and the PDU corresponding to the SDU and does not perform other operations.

When both steps S406 and S407 are executed, there is no sequence of S406 and S407. And in a possible implementation manner, after step S405, either S406 or S407 may also be executed.

It should be noted that if the PDCP layer entity starts the first discard timer and the second discard timer, when the second discard timer expires, if the first timer does not expire, the PDCP layer entity does not perform deletion of the SDU and the PDU corresponding to the SDU, and for, the PDCP layer entity does not instruct the lower layer to delete the PDU corresponding to the SDU.

In Embodiment 4, an example is taken for description where the QoS flow to which the SDU belongs is the first QoS flow, when the QoS flow to which the SDU belongs is not the first QoS flow, the UE performs the following operations: the PDCP layer entity only starts the second discard timer: when the second discard timer expires, the PDCP layer entity deletes the SDU and the PDU corresponding to the SDU.

Figure 9:
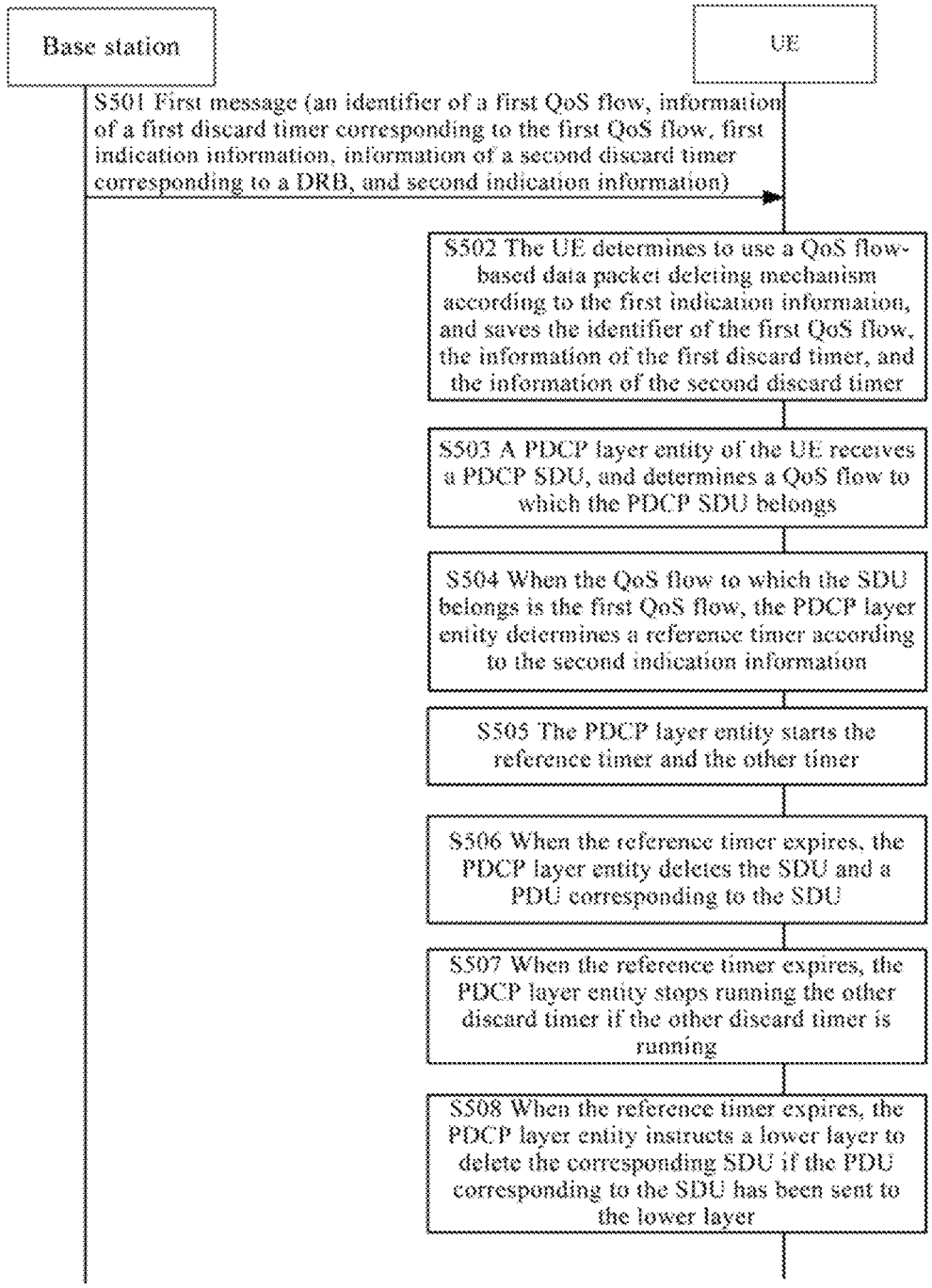
FIG. 9 is a signaling flowchart of a data packet deleting method provided by Embodiment 5 of the present application.

FIG. 9 is a signaling flowchart of a method for a data packet deleting method provided in Embodiment 5 of the present application. In this embodiment, a scenario where a sender is a UE, a protocol layer entity is a PDCP layer entity, and a first discard timer and a second discard timer coexist is taken as an example for description. As shown in FIG. 9, the method provided in this embodiment includes the following steps:

S501, a base station sends a first message to the UE, where the first message includes an identifier of a first QoS flow, information of the first discard timer corresponding to the first QoS flow, first indication information, information of the second discard timer corresponding to a DRB, and second indication information.

The first message may be an RRC message, for example, a PDCP-config message.

Where the DRB in the first message is a DRB to which the first QoS flow is mapped. The first indication information is used for indicating whether to use a QoS flow-based data packet deleting mechanism by the UE. The second indication information is used for indicating a reference discard timer used by the first QoS flow.

S502, the UE determines to use the QoS flow-based data packet deleting mechanism according to the first indication information, and saves the identifier of the first QoS flow, the information of the first discard timer, and the information of the second discard timer.

After the UE receives the first message, if the first indication information indicates the UE to use the QoS flow-based data packet deleting mechanism, then the UE determines to use the QoS flow-based data packet deleting mechanism, and saves the identifier of the first QoS flow, the information of the first discard timer, and the information of the second discard timer.

If the first indication information indicates the UE not use the QoS flow-based data packet deleting mechanism, then the UE determines not to use the QoS flow-based data packet deleting mechanism, and uses a DRB-based data packet deleting mechanism by default, and the UE may only save the information of the second discard timer.

S503, the PDCP layer entity of the UE receives a PDCP SDU, and determines a QoS flow to which the PDCP SDU belongs.

The PDCP layer entity of the UE receives the PDCP SDU from a higher layer (that is, the SDAP layer), detects a packet header of the PDCP SDU to acquire a QFI, the QoS flow corresponding to the acquired QFI is the QoS flow to which the PDCP SDU belongs.

S504, when the QoS flow to which the SDU belongs is the first QoS flow, the PDCP layer entity of the LTE determines a reference timer according to the second indication information.

The second indication information indicates the reference discard timer used by the first QoS flow to be the first discard timer or the second discard timer.

In other embodiments of the present application, the UE may also determine the reference timer according to other rules. For example, according to a type of the data packet (for example, whether it is a data packet corresponding to the first QoS flow), a duration of the timer, an end time of the timer.

S505, the PDCP layer entity starts the reference timer and the other timer.

Where when the reference timer is the first discard timer, the other timer is the second discard timer, and when the reference timer is the second discard timer, the other timer is the first discard timer.

Optionally, in a possible implementation manner of the present application, the PDCP layer entity of the UE may also starts the first reference discard timer only but not the other timer.

Optionally, in a possible implementation manner, the protocol layer entity may also start the first discard timer and the second discard timer first, and then determine the reference timer.

S506, when the reference timer expires, the PDCP layer entity of the UE deletes the SDU and a PDU corresponding to the SDU.

S507, when the reference timer expires, the PDCP layer entity of the UE stops running the other timer if the other timer is running.

Step S507 is an optional step. When the reference timer expires, if the other timer is running, the PDCP layer entity may also ignore the other timer rather than stopping running the other timer.

S508, when the reference timer expires, the PDCP layer entity of the UE may also instruct the lower layer to delete the corresponding SDU if the PDU corresponding to the SDU has been sent to the lower layer.

Step S508 is also an optional step. When the reference timer expires, if the PDU corresponding to the SDU has already been sent to the lower layer, the PDCP layer entity may also not instruct the lower layer to delete the corresponding SDU.

In a possible implementation manner of the present application, the PDCP layer entity of the UE also instructs the lower layer to delete a data packet corresponding to the SDU. The data packet corresponding, to the SDU deleted by the lower layer includes the SDU and/or PDU of the lower layer. When the lower layer of the PDCP layer is the RLC layer, if the RLC layer does not perform packaging or sending of the SDU and/or PDU, the RLC layer may delete the SDU and/or VDU. If the RLC layer has already performed packaging or sending of the SDU and/or PDU, the RLC layer may not delete the SDU and/or PDU, or may also delete the SDU and/or PDU which has been packaged.

When both steps S507 and S508 are executed, there is no sequence of S507 and S508. And in a possible implementation manner, after step S506, either S507 or S508 may also be executed.

In Embodiment 5, an example is taken for description where the QoS flow to which the SDU belongs is the first QoS flow, when the QoS flow to which the SDU belongs is not the first QoS flow, the UE performs the following operations: the PDCP layer entity starts the second discard timer; when the second discard timer expires, the PDCP layer entity deletes the SDU and the PDU corresponding to the SDU.

It should be noted that in Embodiment 4 and Embodiment 5, the PDCP layer entity starts the first discard timer when it is determined that the QoS flow to which the SDU belongs is the first QoS flow, optionally, the PDCP layer entity may start the first discard timer only under certain conditions. For example, when a transmission delay time of the PDCP SDU is greater than or equal to a PDB acquired in advance, the first discard timer is turned on. The PDB may be predefined or notified by the base station, or may be determined by the UE itself.

Those skilled in the art can understand that the UE is taken as an example for description in the above-mentioned Embodiment 4 and Embodiment 5. When the base station serves as the sender, the process of the above-mentioned data packet deleting operation is basically the same. The difference lies in that: the approaches to acquire the identifier of the first QoS flow, the information of the first discard timer used by the first QoS flow, the information of the second discard timer used by the DRB are different.

Figure 10:
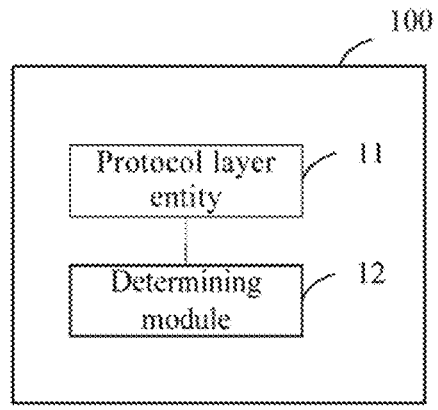
FIG. 10 is a structural diagram of a sender provided by Embodiment 6 of the present application.

FIG. 10 is a structural diagram of a sender provided by Embodiment 6 of the present application, as shown in FIG. 10, the sender 100 includes:

a protocol layer entity 11, configured to receive a service data unit SDU from a higher layer;

a determining module 12, configured to determine a quality of service QoS flow to which the SDU belongs;

the protocol layer entity 11 is further configured to: start a first discard timer corresponding to a first QoS flow when the QoS flow to which the SDU belongs is the first QoS flow; and delete the SDU and a PDU corresponding to the SDU when the first discard timer expires.

In a possible implementation manner of the present application, the protocol layer entity 11 is further configured to: start a second discard timer when the QoS flow to which the SDU belongs is the first QoS flow, where the second discard timer corresponds to a data radio bearer DRB to which the first QoS flow is mapped.

In a possible implementation manner of the present application, the protocol layer entity 11 is further configured to: when the first discard timer expires, stop running the second discard timer if the second discard timer is running.

In a possible implementation manner of the present application, the protocol layer entity 11 is further configured to: when the first discard timer expires, indicate a lower layer to delete a data packet corresponding to the SDU if the PDU corresponding to the SDU has been sent to the lower layer.

In a possible implementation manner of the present application, the protocol layer entity 11 is further configured to: when the QoS flow to which the SDU belongs isn't the first QoS flow, start the second discard timer only; and when the second discard timer expires, delete the SDU and the PDU corresponding to the SDU.

In a possible implementation manner of the present application, it further includes: an acquiring module, configured to acquire an identifier of the first QoS flow and information of the first discard timer.

In a possible implementation manner of the present application, the acquiring module is specifically configured to: receive a first message sent by a network device, where the first message includes the identifier of the first QoS flow and the information of the first discard timer.

In a possible implementation manner of the present application, the acquiring module is specifically configured to: receive a first message sent by a network device, where the first message includes the identifier of the first QoS flow, and the information of the first discard timer is predefined.

In a possible implementation manner of the present application, the acquiring module is specifically configured to: receive a first message sent by a network device, where the first message includes the identifier of the first QoS flow; and determine the information of the first discard timer according to a QoS parameter, where the QoS parameter is acquired by the sender from a non-access stratum NAS message or from the network device.

In a possible implementation manner of the present application, the first message also includes first indication information, and the first indication information is used for indicating whether to use a QoS flow-based data packet deleting mechanism by the sender.

In a possible implementation manner of the present application, the protocol layer entity 11 is further configured to: start the first discard timer when a transmission delay time of the SDU is greater than or equal to a packet delay budget acquired in advance.

The sender provided in any implementation of this embodiment is used for executing the technical solutions executed by the sender in the foregoing method Embodiment 1, Embodiment 2, or Embodiment 4. The implementation principles and technical effects are similar, and details are not described herein again.

Figure 11:
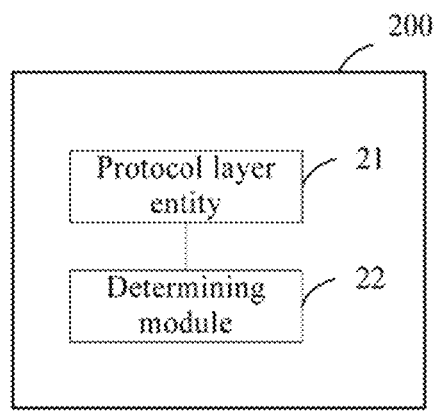
FIG. 11 is a structural diagram of a sender provided by Embodiment 7 of the present application.

FIG. 11 is a structural diagram of a sender provided by Embodiment 7 of the present application, as shown in FIG. 11, the sender 200 includes:

a protocol layer entity 21, configured to receive a service data unit SDU from a higher layer;

a determining module 22, configured to determine a quality of service QoS flow to which the SDU belongs;

the protocol layer entity 21 is further configured to: determine a reference discard timer, start the reference discard timer, and delete the SDU and a PDU corresponding to the SDU when the reference discard timer expires, wherein the reference discard timer is a first discard timer corresponding to the first QoS flow or a second discard timer, and the second discard timer corresponds to a data radio bearer DRB to which the first QoS flow is mapped.

In a possible implementation manner of the present application, the protocol layer entity 21 is specifically configured to: determine the reference discard timer according to a timing duration of the first discard timer and a timing duration of the second discard timer.

In a possible implementation manner of the present application, the protocol layer entity 21 is specifically configured to: receive second indication information, where the second indication information is used for indicating the reference discard timer used by the first QoS flow; and determine the reference discard timer from the first discard timer and the second discard timer according to the second indication information.

In a possible implementation manner of the present application, the protocol layer entity 21 is further configured to: when the reference discard timer expires, indicate a lower layer to delete a data packet corresponding to the SDU if the PDU corresponding to the SDU has been sent to the lower layer.

In a possible implementation manner of the present application, when the reference discard timer expires, if the other discard timer, other than the reference discard timer, out of the first discard timer and the second discard timer is running, the protocol layer entity 22 is further configured to: stop running the other discard timer.

In a possible implementation manner of the present application, the protocol layer entity 21 is further configured to: when the QoS flow to which the SDU belongs isn't the first QoS flow, start the second discard timer only; and when the second discard timer expires, delete the SDU and the PDU corresponding to the SDU.

In a possible implementation manner of the present application, it further includes: an acquiring module, configured to acquire an identifier of the first QoS flow and information of the first discard timer.

In a possible implementation manner of the present application, the acquiring module is specifically configured to: receive a first message sent by a network device, where the first message includes the identifier of the first QoS flow and the information of the first discard timer.

In a possible implementation manner of the present application, the acquiring module is specifically configured to: receive a first message sent by a network device, where the first message includes the identifier of the first QoS flow, and the information of the first discard timer is predefined.

In a possible implementation manner of the present application, the acquiring module is specifically configured to: receive a first message sent by a network device, where the first message includes the identifier of the first QoS flow; and determine the information of the first discard timer according to a QoS parameter, where the QoS parameter is acquired by the sender from a non-access stratum NAS message or from a network device.

In a possible implementation manner of the present application, the first message further includes first indication information, and the first indication information is used for indicating whether to use a QoS flow-based data packet deleting mechanism by the sender.

In a possible implementation manner of the present application, after determining the reference discard timer, the protocol layer entity 21 is further configured to: start the other discard timer, other than the reference discard timer, out of the first discard timer and the second discard timer.

In a possible implementation manner of the present application, the protocol layer entity 21 is specifically configured to: start the first discard timer when a transmission delay time of the SDU is greater than or equal to a packet delay budget acquired in advance.

The sender provided in any implementation of this embodiment is used for executing the technical solutions executed by the sender in the foregoing method Embodiment 3, or Embodiment 5. The implementation principles and technical effects are similar, and details are not described herein again.

Figure 12:
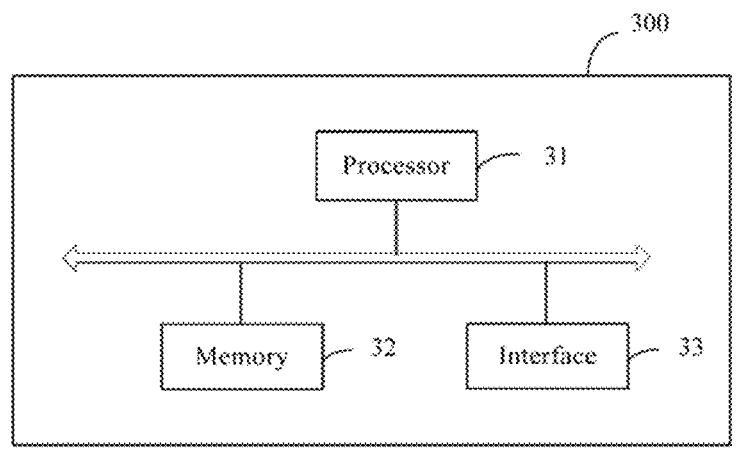
FIG. 12 is a structural diagram of a sender provided by Embodiment 8 of the present application.

FIG. 12 is a structural diagram of a sender provided by Embodiment 8 of the present application, as shown in FIG. 12, the sender 300 includes:

a processor 31, a memory 32, and an interface 33 for communicating with other devices;

the memory 32 stores computer-executable instructions;

the processor 31 executes the computer-executable instructions stored in the memory, so that the processor 31 executes the technical solution executed by the sender in any of the foregoing method embodiments.

FIG. 12 is a simple design of a sender. The embodiment of the present application does not unit the number of processors and memories in the sender. FIG. 12 only takes the number of 1 as an example for illustration.

In a particular implementation of the sender shown in the foregoing embodiments, the memory, the processor, and the interface may be connected by a bus, optionally, the memory may be integrated inside the processor.

The embodiment of the present application also provides a computer-readable storage medium, the computer-readable storage medium stores a computer-executable instruction which, when executed by a processor, is used for implementing the technical solution executed by the sender in any of the foregoing method embodiments.

The embodiment of the present application also provides a program which, when executed by the processor, is used for implementing the technical solution executed by the sender in any of the foregoing method embodiments.

In a possible implementation manner of the present application, the above-mentioned processor may be a chip.

The embodiment of the present application also provides a computer-program product which includes program instructions, the program instructions are used for implementing the technical solution executed by the sender in any of the foregoing method embodiments.

The embodiment of the present application also provides a chip which includes a processing module and a communication interface, the processing module can implement the technical solution executed by the sender in any of the foregoing method embodiments.

Further, the chip also includes a storage module (memory for example), the storage module is used for storing instructions, the processing module is used for executing the instructions stored in the storage module, and execution of the instructions stored in the storage module causes the processing module to implement the technical solution executed by the sender in any of the foregoing method embodiments.

In the several embodiments provided in the present application, it should be understood that the disclosed devices and methods may be implemented in other ways. For example, the device embodiments described above are only illustrative. For example, the division of the modules is only a logical function division, and there may be other divisions in actual implementations, for example, multiple modules can be combined or integrated to another system, or some features can be ignored, or not implemented. In addition, the displayed or discussed mutual coupling or direct coupling or communication connection may be through some interfaces. The indirect coupling or communication connection of the modules may be in electrical, mechanical or other forms.

In the particular implementation of the above-mentioned base station and UE, it should be understood that the processor may be a central processing unit (CPU for short), or other general-purpose processors or digital signal processors (English: Digital Signal Processor, DSP for short), application specific integrated circuits (English: Application Specific Integrated Circuit, ASIC for short), etc. The general-purpose processor may be a microprocessor or the processor may also be any conventional processor or the like. The steps of the method disclosed in the present application may be directly embodied as being executed and completed by a hardware processor, or executed and completed by a combination of hardware and software modules in the processor.

All or part of the steps in the above-mentioned method embodiments can be completed by hardware related to program instructions. The foregoing program can be stored in a readable memory. When the program is executed, it executes the steps that include the above-mentioned method embodiments; and the foregoing memory (storage medium) includes: read-only memories (English: read-only memory, ROM for short), RAMs, flash memories, hard disk drives, solid state drives, magnetic tapes, floppy disks, optical discs and any combination thereof.

What is claimed is:

1. A data packet deleting method, comprising:
    when a protocol layer entity of a sender receives a service data unit (SDU) from a higher layer, determining a quality of service (QoS) flow to which the SDU belongs;
    when the QoS flow to which the SDU belongs is a first QoS flow, starting, by the protocol layer entity, a first discard timer corresponding to the first QoS flow; and
    when the first discard timer expires, deleting, by the protocol layer entity, the SDU and a protocol data unit (PDU) corresponding to the SDU.

2. The method according to claim 1, further comprising:
    when the QoS flow to which the SDU belongs is the first QoS flow, starting, by the protocol layer entity, a second discard timer, wherein the second discard timer corresponds to a data radio bearer (DRB) to which the first QoS flow is mapped.

3. The method according to claim 2, further comprising:
    when the first discard timer expires, stopping running, by the protocol layer entity, the second discard timer if the second discard timer is running.

4. The method according to claim 1, further comprising:
    when the first discard timer expires, indicating, by the protocol layer entity, a lower layer to delete a data packet corresponding to the SDU if the PDU corresponding to the SDU has been sent to the lower layer.

5. The method according to claim 2, further comprising:
    when the QoS flow to which the SDU belongs isn't the first QoS flow, starting, by the protocol layer entity, the second discard timer only; and
    when the second discard timer expires, deleting, by the protocol layer entity, the SDU and the PDU corresponding to the SDU.

6. The method according to claim 1, further comprising:
    acquiring, by the sender, an identifier of the first QoS flow and information of the first discard timer.

7. The method according to claim 6, wherein acquiring, by the sender, the identifier of the first QoS flow and the information of the first discard timer comprises:
    receiving, by the sender, a first message sent by a network device, wherein the first message comprises the identifier of the first QoS flow and the information of the first discard timer.

8. The method according to claim 6, wherein the acquiring, by the sender, the identifier of the first QoS flow and the information of the first discard timer comprises:
    the information of the first discard timer is predefined; and
    receiving, by the sender, a first message sent by a network device, wherein the first message comprises the identifier of the first QoS flow.

9. The method according to claim 6, wherein the acquiring, by the sender, the identifier of the first QoS flow and the information of the first discard timer comprises:

receiving, by the sender, a first message sent by a network device, wherein the first message comprises the identifier of the first QoS flow; and determining, by the sender, the information of the first discard timer according to a QoS parameter, wherein the QoS parameter is acquired by the sender from a non-access stratum (NAS) message or from the network device.

10. The method according to claim 7, wherein the first message further comprises first indication information, and the first indication information is used for indicating whether to use a QoS flow-based data packet deleting mechanism by the sender.

11. The method according to claim 1, wherein the starting, by the protocol layer entity, the first discard timer corresponding to the first QoS flow comprises:

starting the first discard timer when a transmission delay time of the SDU is greater than or equal to a packet delay budget.

12. A sender, comprising:

a processor, a memory, and an interface for communicating with a further device;

the processor is configured to:

control the interface to receive a service data unit (SDU) from a higher layer;

determine a quality of service (QoS) flow to which the SDU belongs; and start a first discard timer corresponding to a first QoS flow when the QoS flow to which the SDU belongs is the first QoS flow; and delete the SDU and a protocol data unit (PDU) corresponding to the SDU when the first discard timer expires.

13. The sender according to claim 12, wherein the processor is further configured to: start a second discard timer when the QoS flow to which the SDU belongs is the first QoS flow, wherein the second discard timer corresponds to a data radio bearer (DRB) to which the first QoS flow is mapped.

14. The sender according to claim 12, wherein the processor is further configured to:

when the first discard timer expires, indicate a lower layer to delete a data packet corresponding to the SDU if the PDU corresponding to the SDU has been sent to the lower layer.

15. The sender according to claim 12, the processor is further configured to:

control the interface to acquire an identifier of the first QoS flow and information of the first discard timer.

16. The sender according to claim 15, wherein the processor is configured to:

control the interface to receive a first message sent by a network device, wherein the first message comprises the identifier of the first QoS flow and the information of the first discard timer.

17. The sender according to claim 15, wherein the processor is configured to:

control the interface to receive a first message sent by a network device, wherein the first message comprises the identifier of the first QoS flow; and the information of the first discard timer is predefined.

18. The sender according to claim 15, wherein the processor is configured to:

control the interface to receive a first message sent by a network device, wherein the first message comprises the identifier of the first QoS flow; and determine the information of the first discard timer according to a QoS parameter, wherein the QoS parameter is acquired by the sender from a non-access stratum (NAS) message or from the network device.

19. The sender according to claim 12, wherein the protocol layer entity is configured to:

start the first discard timer when a transmission delay time of the SDU is greater than or equal to a packet delay budget.

20. A non-transitory computer-readable storage medium, wherein the non-transitory computer-readable storage medium stores a computer-executable instruction, the computer-executable instruction, when executed by a processor, executes the following steps:

when a protocol layer entity of a sender receives a service data unit (SDU) from a higher layer, determining a quality of service (QoS) flow to which the SDU belongs;

when the QoS flow to which the SDU belongs is a first QoS flow, starting a first discard timer corresponding to the first QoS flow; and when the first discard timer expires, deleting the SDU and a protocol data unit (PDU) corresponding to the SDU.

* * * * *